Figure 1:
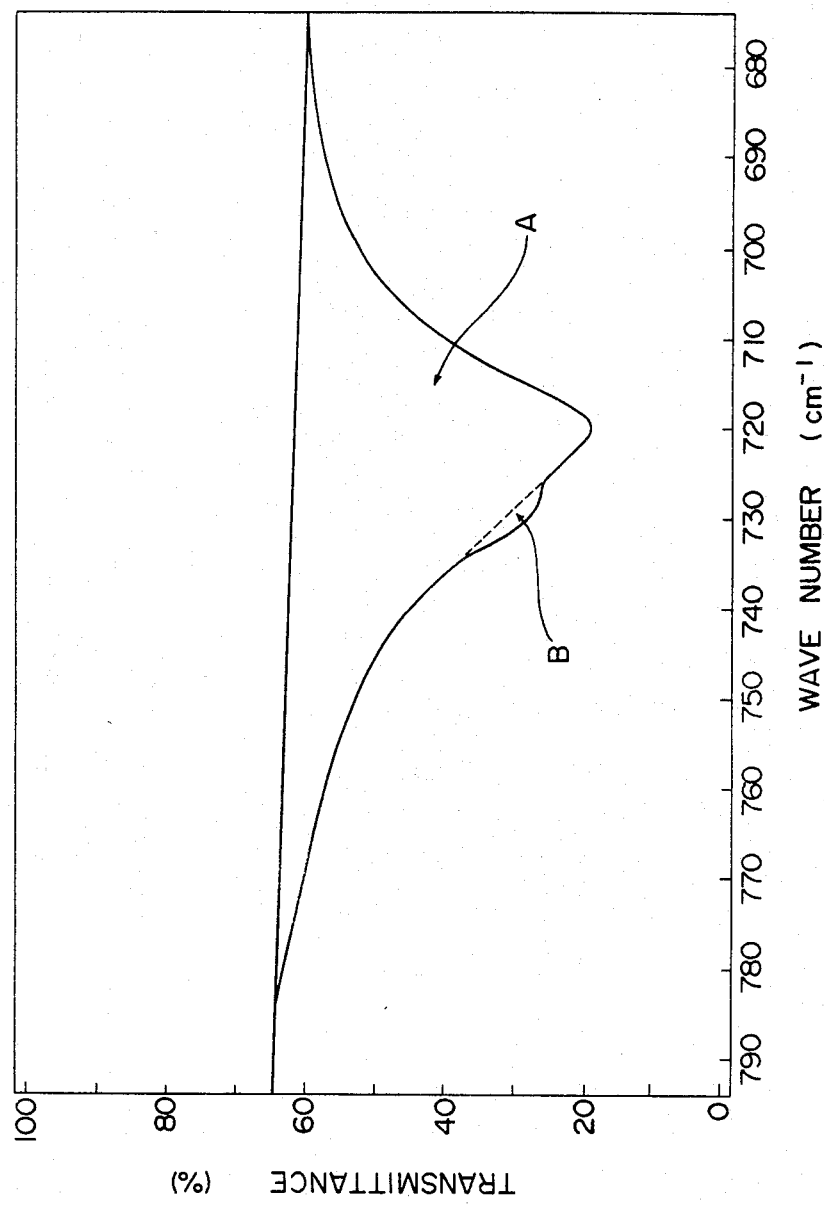

United States Patent [19]

Makino et al.

[11] Patent Number: 4,506,061

[45] Date of Patent: Mar. 19, 1985

[54] PROCESS FOR PRODUCING OLEFIN COPOLYMER RUBBER

[75] Inventors: Kenya Makino; Hideo Sakurai, both of Kuwana; Toshiyuki Toyoda, Kameyama; Yoshitaka Matsuo, Yokkaichi, all of Japan

[73] Assignee: Japan Synthetic Rubber Co., Ltd., Tokyo, Japan

[21] Appl. No.: 423,214

[22] Filed: Sep. 24, 1982

[30] Foreign Application Priority Data

Dec. 28, 1981 [JP] Japan .................................. 56-209713

[51] Int. Cl.$^3$ ................................................ C08F 4/64
[52] U.S. Cl. ............................................................. 526/142
[58] Field of Search ........................................... 526/142

[56] References Cited

U.S. PATENT DOCUMENTS

| | | | |
|---|---|---|---|
| 4,321,346 | 3/1982 | Ueno et al. | 526/142 |
| 4,366,297 | 12/1982 | Makino et al. | 526/119 |
| 4,377,671 | 3/1983 | Makino et al. | 526/124 |

FOREIGN PATENT DOCUMENTS 52-153896 12/1977 Japan .

*Primary Examiner*—Paul R. Michl
*Attorney, Agent, or Firm*—Wenderoth, Lind & Ponack

[57] ABSTRACT

A process for producing an olefin copolymer rubber containing 25 to 75% by weight of propylene, which comprises polymerizing ethylene and propylene, or ethylene, propylene and at least one nonconjugated diene, in solution in the presence of a catalyst, said catalyst being composed of (A) a Ti-containing solid component precipitated from a liquid product obtained by reacting a titanium tetrahalide with an organomagnesium compound in a halogenated hydrocarbon solvent in the presence of an ether represented by the general formula $R^1OR^2$ wherein $R^1$ and $R^2$ are identical or different and each represents a hydrocarbon group having 2 to 12 carbon atoms, and (B) an organoaluminum compound.

15 Claims, 1 Drawing Figure

PROCESS FOR PRODUCING OLEFIN COPOLYMER RUBBER

This invention relates to a process for producing an ethylene-propylene copolymer rubber having good processability, a high tensile strength and a high degree of randomness in good yields.

The present inventors investigated novel catalysts in order to produce an ethylene-propylene copolymer rubber having good randomness. Consequently, they succeeded in obtaining a rubbery copolymer of ethylene and propylene having good processability, a high tensile strength and a high elongation by using a catalyst composed of a compound of an element of Groups I to III of the periodic table (preferably an organoaluminum compound) and a Ti-containing liquid product which is obtained by reducing a titanium tetrahalide while maintaining it in a liquid state. This technique is the subject of U.S. patent application Ser. No. 200,066 filed Oct. 23, 1980, now U.S. Pat. No. 4,366,297 and Italian Patent Application No. 25540A/80 filed Oct. 23, 1980.

So far, a method of obtaining a Ti-containing liquid product by reducing titanium tetrachloride with an organomagnesium compound has been disclosed in Japanese Laid-Open Patent Publication No. 153896/1977 (the abstract in DERWENT No. 10955A) and the above-cited U.S. patent application Ser. No. 200,066 and Italian Patent Application No. 25540A/80.

The inventors worked extensively in an attempt to obtain a catalyst which is highly active in the copolymerization of ethylene with propylene to give a copolymer having a high degree of randomness. This work has led to the discovery that a catalyst composed of an organoaluminum compound and a Ti-containing fine solid powder precipitated from a uniform yellowish black liquid product obtained by reducing a titanium halide with an organomagnesium compound in the presence of an ether in a halogenated hydrocarbon solvent, can give a rubbery copolymer of ethylene and propylene having good randomness while retaining its high activity.

Japanese Laid-Open Patent Publication No. 153896/1977 discloses a process for producing a polyolefin having high stereospecificity which comprises polymerizing an olefin in the presence of a catalyst prepared by reducing titanium tetrachloride with an organomagnesium compound in an aromatic hydrocarbon solvent in the presence of an ether, adding a halide of silicon or boron to the resulting liquid product, heating the mixture to form a fine solid powder, and combining the fine powder with an organoaluminum compound. The purpose of this method is to produce a polyolefin (particularly isotactic polypropylene) having high stereospecificity by using an aromatic hydrocarbon in the reduction of titanium tetrachloride. This patent document also includes a statement to the effect that a random or block copolymer of at least two alpha-olefins can be produced by the method disclosed. However, when the inventors retested the copolymerization of ethylene and propylene using a catalyst obtained by the method disclosed in this patent document, a plastic block copolymer was obtained as disclosed in the patent document, but a random copolymer of ethylene and propylene could not be obtained.

The process of this invention is characterized by the fact that a halogenated hydrocarbon is used as a solvent in reducing a titanium tetrahalide with an organomagnesium compound while maintaining the titanium tetrahalide liquid, and that a Ti-containing fine solid powdery component is precipitated from the resulting uniform liquid product and combined with an organoaluminum compound. By these characteristics, a highly active catalyst is obtained which can give a random copolymer of ethylene and propylene.

Thus, according to this invention, there is provided a process for producing an olefin copolymer rubber containing 25 to 75% by weight of propylene, which comprises polymerizing ethylene and propylene, or ethylene, propylene and a nonconjugated diene, in solution in the presence of a catalyst, said catalyst being composed of (A) a Ti-containing solid component precipitated from a liquid product obtained by reacting a titanium tetrahalide with an organomagnesium compound in a halogenated hydrocarbon solvent in the presence of an ether represented by the general formula $R^1OR^2$ wherein $R^1$ and $R^2$ are identical or different and each represents a hydrocarbon group having 2 to 12 carbon atoms, and (B) an organoaluminum compound.

Examples of the titanium tetrahalide used for the preparation of the catalyst component (A) are titanium tetrachloride, titanium tetrabromide and titanium tetraiodide. Mixtures of these may also be used.

The ether used in the invention is represented by the general formula $R^1OR^2$ wherein $R^1$ and $R^2$ are identical or different and each represents a hydrocarbon group having 2 to 12 carbon atoms. Specific examples are given below.

(1) Dialkyl ethers

Diethyl ether, di-n-propyl ether, di-n-butyl ether, di-n-hexyl ether, di-n-octyl ether, di-n-decyl ether, di-n-dodecyl ether, hexyloctyl ether and dicyclohexyl ether.

(2) Dialkenyl ethers bis(1-Octenyl)ether, bis(1-decenyl)ether and 1-octenyl-9-decenyl ether.

(3) Diaralkyl ethers bis(Benzyl)ether.

(4) Alkylalkenyl ethers n-Octyl-1-decenyl ether and n-decyl-1-decenyl ether.

(5) Alkylaralkyl ethers n-Octylbenzyl ether and n-decylbenzyl ether.

(6) Aralkylalkenyl ethers 1-Octenylbenzyl ether.

Of these ethers, those of the above general formula in which $R^1$ and $R^2$ are linear alkyl groups are especially preferred.

Illustrative of the halogenated hydrocarbon solvent used in the preparation of the catalyst component (A) are halogenated products of saturated aliphatic hydrocarbons having 1 to 12 carbon atoms, halogenated products of saturated alicyclic hydrocarbons having 5 to 12 carbon atoms and halogenated products of aromatic hydrocarbons having 6 to 9 carbon atoms. These halogenated hydrocarbon solvents may be used singly or as a mixture of two or more. Specific examples are given below.

(1) Halogenated products of saturated aliphatic hydrocarbons

Methylene chloride, chloroform, carbon tetrachloride, monochloroethane, ethyl iodide, 1,2-dichloroethane, 1,1-dichloroethane, 1,1,2-trichloroethane, 1,1,2,2-tetrachloroethylene, 1,2-dichloropropone n-butyl chloride and n-butyl iodide.

(2) Halogenated products of saturated alicyclic hydrocarbons

Chlorocyclohexane.

(3) Halogenated products of aromatic hydrocarbons

Chlorobenzene, bromobenzene, iodobenzene, and o-dichlorobenzene.

Of these halogenated hydrocarbon solvents, the halogenated products of saturated aliphatic hydrocarbons having 1 to 12 carbon atoms are preferred.

The organomagnesium compound used as a reducing agent for the titanium tetrahalide in this invention is represented by the general formula RMgX wherein R represents a hydrocarbon group having 1 to 20, preferably 1 to 12, carbon atoms, and X represents a halogen atom or the same hydrocarbon group as R, the group —OR$^1$, the group —SR$^1$, the group

in which R$^1$ and R$^2$ are identical with, or different from R and each represents a hydrocarbon group having 1 to 20, preferably 1 to 12, carbon atoms. Compounds of the above general formula in which R, R$^1$ and R$^2$ are linear alkyl groups or alkenyl groups are especially preferred. Thus, specific examples of the organomagnesium compounds used in this invention include diethyl magnesium, dibutyl magnesium, ethyl magnesium chloride, butyl magnesium chloride, octyl magnesium chloride, ethyl magnesium bromide, butyl magnesium bromide, alkyl magnesium iodide such as methyl magnesium iodide, ethyl magnesium iodide, n-propyl magnesium iodide, n-butyl magnesium iodide and n-octyl magnesium iodide, ethyl n-butoxy magnesium, n-butyl n-butoxy magnesium, diethylaminoethyl magnesium, diethylamino-n-butyl magnesium, di-n-butylamino-n-butyl magnesium, ethyl-n-butylthiomagnesium and n-butyl-n-butylthiomagnesium. These organomagnesium compounds may also be used as a mixture of two or more.

In the reduction of the titanium tetrahalide with the organomagnesium compound, a small amount of an organometallic compound of an element of Groups I to III other than magnesium may be used together with the organomagnesium compound. Examples of such an organometallic compound are organoaluminum compounds such as triethyl aluminum and triisobutyl aluminum and organolithium compounds such as n-butyl lithium.

The reducing treatment of the titanium tetrahalide with the organomagnesium compound in the halogenated hydrocarbon solvent can be carried out by any desired method so long as it is carried out in the presence of the ether. Preferably, it is carried out by adding dropwise a solution of the organomagnesium compound in the ether to a solution of the titanium tetrahalide in the halogenated hydrocarbon solvent, or adding dropwise the halogenated hydrocarbon solution of the titanium tetrahalide to the organomagnesium compound solution with vigorous stirring.

The reduction of the titanium tetrahalide with the organomagnesium compound is carried out by contacting the two at a temperature of usually not more than 80° C., preferably not more than 50° C. When the temperature is low, the reaction mixture may be aged at an elevated temperature after the reaction.

The reduction of the titanium tetrahalide with the organomagnesium compound may be carried out in the further presence of a small amount of an alpha-olefin such as propylene, butene-1 or hexene-1.

In these methods, the mole ratio of the titanium tetrahalide to the ether is preferably from 1:0.2 to 1:20, especially preferably from 1:0.5 to 1:5.

The mole ratio of the titanium tetrahalide to the organomagnesium compound, in terms of the mole ratio of titanium to the alkyl groups of the organomagnesium compound, is from 1:0.2 to 1:10, preferably from 1:0.3 to 1:5.

From the resulting liquid product, a fine powdery solid component may be precipitated, for example, by (1) heating, (2) removing the ether, (3) adding a poor solvent, or (4) removing the solvent.

The fine powdery solid component can be obtained effectively by one, or a combination, of these methods. Specific procedures according to these methods are as shown below. It should be understood however that the invention is not limited to these specific methods.

(1) The liquid product is heated to a temperature of up to 200° C., preferably 50° to 150° C. to coagulate the product of reduction of titanium tetrachloride with the organomagnesium compound.

(2) While stirring the liquid product, a poor solvent for the product of reduction of titanium tetrachloride with the organomagnesium compound is slowly added dropwise.

(3) The liquid product is heated while adding a poor solvent to it, thereby removing the ether and/or the solvent.

(4) The liquid product is heated to remove the ether and/or the solvent.

The poor solvent for the reduction product used in the above procedures may be an aliphatic hydrocarbon having 5 to 12 carbon atoms, such as pentane, hexane, heptane, octane, nonane, and decane. Pentane, hexane and heptane are preferred.

The precipitation of the solid component by the above procedures may be carried out in the presence of a fine powder of an inorganic solid compound. Examples include silica, alumina and zeolite. The fine inorganic solid compound has a surface area of at least 100 m$^2$/g, preferably at least 200 m$^2$/g, an average particle diameter of not more than 50 microns, preferably not more than 30 microns, and an average pore diameter of at least 50 Å, preferably at least 60 Å.

The fine solid component precipitated by the above procedures is preferably washed with the aforesaid poor solvent and used as suspended in the poor solvent.

The catalyst component (B) used in this invention is an organoaluminum compound represented by the general formula AlR$_m$X$_{3-m}$ wherein R represents a hydrocarbon group having 1 to 12 carbon atoms, X represents a halogen atom or an alkoxy group having 1 to 12 carbon atoms, and m is a number represented by $1 \leq m \leq 3$. Two or more of these compounds may be used in combination.

Specific examples of the organoaluminum compound used in this invention include triethyl aluminum, tri-n-propyl aluminum, tri-n-butyl aluminum, tri-i-butyl aluminum, tri-n-hexyl aluminum, tri-n-octyl aluminum, tri-n-dodecyl aluminum, tri(2-methylpentyl)aluminum, di-i-butyl aluminum hydride, ethyl aluminum sesquichloride, diethyl aluminum chloride, ethyl aluminum dichloride, diethyl aluminum ethoxide and diethyl aluminum iodide. Of these, the trialkyl aluminums are especially preferred. The ratio of the catalyst component (A) to the catalyst component (B), expressed as the atomic ratio of titanium to aluminum, is usually in the range of from 1:0.2 to 1:200, preferably from 1:1 to 1:50.

Monomers suitable for polymerization by the catalyst of this invention are ethylene and propylene. By copolymerizing them, a rubbery copolymer can be obtained.

In order to facilitate the vulcanization of the copolymer rubber, a nonconjugated polyene may be copolymerized together with ethylene and propylene. The nonconjugated polyene may be properly chosen from bridged cyclic hydrocarbon compounds, monocyclic compounds, heterocyclic compounds, aliphatic compounds, and spiro examples. Specific compounds of the diene compound used in this invention include dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, 5-(2'-butenyl)-2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 1,4-hexadiene, 1,6-octadiene, 4-methyl-1,4-hexadiene, 5-methyl-1,4-hexadiene, and 6-methyl-1,5-heptadiene. Dicyclopentadiene, 5-ethylidene-2-norbornene and 5-isopropenyl-2-norbornene are preferred.

The polymerization temperature is usually 10° to 150° C., preferably 30° to 120° C., and the polymerization pressure is usually from atmospheric pressure to 100 kg/cm$^2$. The monomeric gas feed has such a composition that the ratio of ethylene to propylene is in the range of from 1:9 to 5:5.

The copolymerization is suitably carried out by a solution polymerization method whereby the copolymerization is carried out in a good solvent for the resulting copolymer. Hydrocarbons such as n-hexane and n-heptane are frequently used as the solvent. The copolymerization may be carried out batchwise or continuously. The molecular weight of the copolymer may be controlled as desired by using hydrogen.

By feeding ethylene and propylene as a gaseous mixture in a required mixing ratio, or simultaneously at controlled rates, into the catalyst layer of a reaction zone, the ratio of the concentrations of ethylene and propylene in the gaseous phase in the reaction zone is always maintained at a predetermined ratio required to form a rubbery copolymer containing 25 to 70% by weight, preferably 35 to 65% by weight, of propylene.

In order to obtain a rubbery random copolymer, the composition of the gas, the polymerization temperature and the polymerization pressure should be selected so that the resulting copolymer dissolves in the polymerization solvent and solution polymerization proceeds.

The following examples specifically illustrate the present invention. The various properties of the copolymers in these examples were measured or determined by the following methods.

Mooney viscosity

Measured for 4 minutes at 100° C. after preheating for one minute (ML$_{1+4}^{100°}$).

Propylene content

Determined from the infrared absorption spectrum of the copolymer.

Iodine value

Measured by the titration method.

100% Modulus, tensile strength, elongation at break and Shore A hardness

Measured by methods substantially in accordance with JIS K-6301.

In the following examples, a random index (R. I.) is used as a measure of the random arrangement of ethylene and propylene in the copolymer. R. I. is calculated from the following equation.

R.I.(%) = (the area of A)/(the area of A + the area of B) × 100

In the above equation, A corresponds to the absorption intensity at 730 cm$^{-1}$ (attributed to the crystallinity of polyethylene), and B, to the absorption intensity at 720 cm$^{-1}$ (attributed to the skeletal vibration of —CH$_2$—$_n$), in the infrared absorption spectrum of the copolymer.

The accompanying drawing is an enlarged view of the absorptions at 720 and 730 cm$^{-1}$ of the infrrared absorption spectrum of the copolymer shown for determining the areas of A and B mentioned above.

EXAMPLE 1

(1) Preparation of catalyst component (A)

A 200 ml three-necked flask equipped with a rotor, a thermometer and a three-way cock was fully dried, and purged with nitrogen. The flask was charged with 30 ml of dried 1,2-dichloroethane and 2 millimoles of titanium tetrachloride. The flask was cooled and maintained at 0° C. A di-n-butyl ether solution of n-butyl magnesium iodide in an amount of 2 millimoles as n-butyl magnesium iodide was gradually added dropwise with stirring (the magnesium/titanium atomic ratio = 1.0; the ether/titanium mole ratio = 3.0). After the addition, a uniform blackish brown solution formed. To the solution was added 100 ml of dried n-hexane, and the mixture was stirred for 1 hour. When the stirring was stopped, a solid component containing a fine powder of titanium trichloride was precipitated. The supernatant liquid was removed by decantation, and the fine powdery solid component was washed with 100 ml of a fresh supply of n-hexane. Washing with n-hexane was performed five times, and then n-hexane was further added to adjust the total amount of the slurry to 50 ml. The concentration of titanium in the slurry, analyzed by an absorbance method using a visible absorption spectrum, was 0.039 mole/liter.

(2) Copolymerization

A stirring vane, a three-way cock, a gas blowing tube and a thermometer were fitted to a 3-liter separable flask, and the flask was purged fully with nitrogen and dried. The flask was then charged with 2,000 ml of n-hexane, and a gaseous mixture composed of ethylene (4 liters/min.), propylene (6 liters/min.) and hydrogen (0.3 liters/min.), which had been dried by passing it through molecular sieves, was introduced into the flask kept at 35° C. through the gas blowing tube for 10 minutes.

1.75 millimoles of tri-i-butyl aluminum and 0.175 millimole, as titanium, of the catalyst component (A) prepared as above were added, and the polymerization of ethylene and propylene was started. While maintaining the temperature at 35° C., the polymerization was carried out for 30 minutes. Methanol (50 ml) was added to the polymer solution to stop the copolymerization. During the copolymerization, the solution was uniform, and no precipitation of the copolymer was observed. Water (1 liter) was added, and the mixture was well stirred. The mixture was then subjected to steam stripping to give a rubbery copolymer. The amount of the copolymer yielded was 156 g. The amount of the copolymer yielded per hour per gram of the titanium atom in the catalyst was 35,800 g/g-Ti/hr. Its R. I. value, determined from its infrared absorption spectrum, was nearly zero.

The various properties of the copolymer obtained in this example were as follows:
Propylene content: 51% by weight
$ML_{1+4}^{100°}$: 30
100% Modulus: 5 kg/cm$^2$
Tensile strength: 8 kg/cm$^2$
Elongation at break: 3300%
Shore A hardness: 3

EXAMPLE 2

A 5-liter autoclave equipped with a stirring vane, a gas introducing tube, a thermometer and a catalyst introducing tube was charged with 3 liters of dried and deoxygenated n-hexane. A gaseous mixture of monomers and hydrogen (ethylene/propylene/hydrogen volume ratio=3:7:0.3) dried through molecular sieves was introduced into the autoclave kept at 45° C. through the gas introducing tube and maintained under a pressure of 7 kg/cm$^2$.

1.0 millimole of tri-isobutyl aluminum and 0.1 millimole, calculated as titanium, of the catalyst component (A) obtained in Example 1 were added, and the polymerization of the monomers was started. During the polymerization, the gaseous mixture having the above composition was fed while it was maintained under a pressure of 7 kg/cm$^2$, and the polymerization was carried out at 45° C. for 30 minutes. Methanol (10 ml) was added to stop the polymerization. The dissolved monomers were purged, and a small amount of an antioxidant was added. The mixture was then subjected to steam stripping to obtain a rubbery copolymer.

The amount of the copolymer yielded was 290 g. The amount of the copolymer yielded per gram of the titanium atom of the catalyst per hour was 120,000 g/g-Ti/hr. The copolymer had a propylene content of 43% by weight, and an R. I. value, determined from its infrared absorption spectrum, of nearly zero.

EXAMPLE 3

The same copolymerization as in Example 1 was carried out except that for 25 minutes from the start of the polymerization, 50 ml of a solution of 12 ml of 5-ethylidene-2-norbornene in hexane was added at a rate of 2 ml/min.

There was obtained 136 g of a copolymer having a propylene content of 48% by weight and an iodine value of 16. The other properties of the copolymer were as follows:
$ML_{1+4}^{100°}$: 34
100% Modulus: 7 kg/cm$^2$
Tensile strength: 10 kg/cm$^2$
Elongation at break: 3,100%
Shore A hardness: 35

EXAMPLE 4

Example 3 was followed except that dicyclopentadiene was used instead of 5-ethylidene-2-norbornene. There was obtained 122 g of a copolymer having a propylene content of 46% by weight, an iodine value of 14, an $ML_{1+4}^{100°}$ of 41 and an R. I. value, determined from its infrared absorption spectrum, of nearly zero.

EXAMPLES 5 TO 13

A catalyst component (A) was prepared in accordance with Example 1 using the Grignard compounds and ethers shown in Table 1. By using the catalyst component (A), ethylene, propylene and 5-ethylidene-2-norbornene were copolymerized in the same way as in Example 3. The results are summarized in Table 1.

TABLE 1

| | Preparation of the catalyst component (A) | | | Amount of the copolymer yielded (g) | Propylene content (wt. %) | Iodine value | $ML_{1+4}^{100°}$ | R.I. value |
|---|---|---|---|---|---|---|---|---|
| Example | Preparation of the Grignard compound | | Solvent | | | | | |
| | RMgX | Ether | | | | | | |
| 3 | BuMgI | Bu$_2$O | 1,2-Dichloroethane | 136 | 48 | 16 | 34 | near 0 |
| 5 | BuMgBr | " | " | 129 | 47 | 17 | 36 | near 0 |
| 6 | BuMgCl | " | " | 133 | 47 | 15 | 41 | near 0 |
| 7 | MeMgI | " | " | 96 | 45 | 21 | 34 | near 0 |
| 8 | EtMgI | " | " | 126 | 46 | 20 | 44 | near 0 |
| 9 | OctMgI | " | " | 133 | 48 | 14 | 27 | near 0 |
| 10 | BuMgI | Et$_2$O | " | 87 | 42 | 19 | 59 | near 0 |
| 11 | " | Oct$_2$O | " | 149 | 50 | 16 | 25 | near 0 |
| 12 | " | Bu$_2$O | Monochlorobenzene | 128 | 47 | 16 | 36 | near 0 |
| 13 | " | " | Methylene chloride | 133 | 49 | 15 | 34 | near 0 |

In the table, Me stands for a methyl group; Bu, for a butyl group; and Oct, for a n-octyl group.

EXAMPLE 14

(1) Preparation of a catalyst component (A)

A catalyst component (A) was prepared in the same way as in Example 1 except that 1 millimole of an n-hexane solution of di-n-butyl magnesium and di-n-butyl ether was added instead of the di-n-butyl ether solution of n-butyl magnesium iodide.

(2) Copolymerization

Using the catalyst component (A) obtained in (1) above, the same copolymerization as in Example 3 was performed. There was obtained 82 g of a copolymer having a propylene content of 46% by weight, an iodine value of 21 and an $ML_{1+4}^{100°}$ of 51. The R. I. value of the copolymer, determined from its infrared absorption spectrum, was nearly zero. No formation of a gel was observed during the polymerization.

COMPARATIVE EXAMPLE 1

Toluene was used instead of 1,2-dichloroethane in the preparation of the catalyst component (A) in Example 1. When n-butyl magnesium iodide was added, a complete uniform solution was not formed, but a part of the catalyst precipitated. The operation was continued to prepare a catalyst component (A). Using the resulting catalyst component (A), the same copolymerization as in Example 1 was carried out. There was obtained 116 g of a copolymer having a propylene content of 35% by weight. The R. I. value of the copolymer, determined from its infrared absorption spectrum, was 1.7.

The result shows the superiority of the use of the halogenated hydrocarbon solvent in the preparation of the catalyst component (A).

COMPARATIVE EXAMPLE 2 n-Hexane was used instead of 1,2-dichloroethane in the preparation of the catalyst component (A) in Example 1. When n-butyl magnesium iodide was added, an oily product formed, and a uniform liquid product was not obtained. When 100 ml of n-hexane was further added, no powdery solid component was obtained, and the oily product remained. It was impossible therefore to attempt copolymerization using the oily product.

COMPARATIVE EXAMPLE 3

Example 1 was followed except that a gaseous mixture of ethylene (0.5 liter/min.) and propylene (9.5 liters/min.) (not containing hydrogen) was used in performing copolymerization using the catalyst component (A) obtained in Example 1. During the copolymerization, no gel formed, and a clear uniform solution resulted. The amount of the copolymer yielded was as small as 36 g. The copolymer had a propylene content of 80% by weight and an $ML_{1+4}^{100°}$ of 8. Since it had a low Mooney viscosity, it stuck greatly to processing rolls. Accordingly, this copolymer was found to be useless as a rubber material.

COMPARATIVE EXAMPLE 4

The same copolymerization as in Example 1 was carried out using the catalyst component (A) obtained in Example 1 except that a gaseous mixture consisting of ethylene (7.5 liters/min.), propylene (2.5 liters/min.) and hydrogen (0.3 liter/min.) was used. During the copolymerization, a large amount of a gel insoluble in the polymerization solvent formed. There was obtained 163 g of a copolymer having a propylene content of 21% by weight and an $ML_{1+4}^{100°}$ of 72. The R. I. value of the copolymer, determined from its infrared absorption spectrum, was 2.1.

It is seen from this comparative example that when the propylene content of the copolymer is low, the copolymer is not a rubbery copolymer, but becomes resinous like polyethylene.

EXAMPLE 15

Example 1 was followed except that a gaseous mixture consisting of ethylene (5.5 liters/min.), propylene (4.5 liters/min.) and hydrogen (0.3 liter/min.) was used. During the copolymerization, a very small amount of a gel insoluble in the polymerization solvent formed, but the polymerization proceeded substantially in uniform solution. There was obtained 158 g of a copolymer having a propylene content of 28% by weight, and an $ML_{1+4}^{100°}$ of 64. The R. I. value of the copolymer, determined from its infrared absorption spectrum, was 0.7.

EXAMPLE 16

Example 1 was followed except that a gaseous mixture consisting of ethylene (2.5 liters/min.), propylene (7.5 liters/min.) and hydrogen (0.1 liter/min.) was used. During the copolymerization, no gel insoluble in the polymerization solvent formed. There was obtained 75 g of a copolymer having a propylene content of 68% by weight and an $ML_{1+4}^{100°}$ of 21.

COMPARATIVE EXAMPLE 5

This shows a comparative experiment in which the titanium component is a uniform solution.

(1) Preparation of catalyst component

A 200 ml three-necked flask fully dried and purged with nitrogen was charged with 10 millimoles of titanium tetrachloride and 50 ml of 1,2-dichloroethane. Then, the flask was maintained at 0° C., and 10 millimoles, as n-butyl magnesium iodide, of a solution of n-butyl magnesium iodide in di-n-butyl ether was gradually added dropwise with stirring (the magnesium/titanium atomic ratio=1.0; the ether/titanium mole ratio=3.0). After the addition, a uniform blackish brown solution formed.

(2) Copolymerization

The same copolymerization as in Example 1 was carried out except that 0.7 millimole, as titanium, of the uniform solution prepared above and 0.7 millimole of tri-isobutyl aluminum were used instead of the catalyst component (A) used in Example 1. During the copolymerization, no precipitation of a gel-like copolymer was observed. There was obtained 124 g of a copolymer having an R. I. value of 0.5. The amount of the copolymer yielded per gram of the titanium atom in the catalyst per hour was 7,400 g/g-Ti/hr. This shows that the polymerization activity of the catalyst used was only above one-fifth that of the catalyst used in Example 1.

What is claimed is:

1. A process for producing an olefin copolymer rubber containing 25 to 75% by weight of propylene, which comprises polymerizing ethylene and propylene, or ethylene, propylene and at least one nonconjugated diene, at a temperature of 10° to 150° C., in solution in the presence of a catalyst, said catalyst comprising
   (A) a Ti-containing solid component precipitated from a liquid product obtained by reacting a titanium tetrahalide with an organomagnesium compound in a halogenated hydrocarbon solvent in the presence of an ether of the formula $R^1OR^2$ wherein $R^1$ and $R^2$ are identical or different and each represents a hydrocarbon group having 2 to 12 carbon atoms, and
   (B) an organoaluminum compound,
   wherein the ratio of the catalyst component (A) to the catalyst component (B) is in the range of from 1:0.2 to 1:200 based on the atomic ratio of titanium to aluminum.

2. The process of claim 1 wherein the halogenated hydrocarbon solvent is a halogenated saturated aliphatic hydrocarbon having 1 to 12 carbon atoms.

3. The process of claim 2 wherein the halogenated saturated aliphatic hydrocarbon is methylene chloride, 1,2-dichloroethane or 1,2-dichloropropane.

4. The process of claim 1 wherein $R^1$ and $R^2$ are linear alkyl groups.

5. The process of claim 4 wherein the ether is diethyl ether, di-n-propyl ether, di-n-butyl ether, di-n-hexyl ether or di-n-octyl ether.

6. The process of claim 1 wherein the titanium tetrahalide is titanium tetrachloride.

7. The process of claim 1 wherein the organomagnesium compound is an alkyl magnesium iodide.

8. The process of claim 7 wherein the alkyl magnesium iodide is methyl magnesium iodide, ethyl magnesium iodide, n-propyl magnesium iodide, n-butyl magnesium iodide or n-octyl magnesium iodide.

9. The process of claim 1 wherein the solid component (A) of the catalyst is precipitated from the liquid product obtained by treating titanium tetrachloride with the organomagnesium compound, by using a poor solvent for the product of reduction of titanium tetrachloride with the organomagnesium compound.

10. The process of claim 9 wherein the solid component (A) is precipitated by slowly adding dropwise a hydrocarbon selected from the group consisting of pentane, hexane and heptane as the poor solvent to the liquid product with stirring.

11. The process of claim 1 wherein the polymerization is carried out at a temperature of 30° to 120° C.

12. The process of claim 1 wherein the organoaluminum compound is a trialkyl aluminum.

13. The process of claim 12 wherein the trialkyl aluminum is tri-n-butyl aluminum, tri-i-butyl aluminum, tri-n-hexyl aluminum, tri-n-octyl aluminum or tri-n-dodecyl aluminum.

14. The process of claim 1 wherein the nonconjugated diene is selected from dicyclopentadiene, 5-ethylidene-2-norbornene and 5-isopropenyl-2-norbornene.

15. The process of claim 1 wherein the mole ratio of the titanium tetrahalide to the organomagnesium compound is from 1:0.2 to 1:10 based on the mole ratio of titanium to alkyl groups of the organomagnesium compound; the mole ratio of the titanium tetrahalide to the ether is from 1:0.2 to 1:20, and the reaction to produce the liquid product is carried out at a temperature of not more than 80° C.

* * * * *